United States Patent [19]

Hudson, Jr.

[11] 3,984,810

[45] *Oct. 5, 1976

[54] DIRECTION WARNING INDICATOR ENERGIZING CIRCUIT

[75] Inventor: James Elmore Hudson, Jr., Dallas, Tex.

[73] Assignee: Simplec Manufacturing Company, Dallas, Tex.

[ * ] Notice: The portion of the term of this patent subsequent to July 17, 1990, has been disclaimed.

[22] Filed: July 2, 1973

[21] Appl. No.: 375,349

Related U.S. Application Data

[62] Division of Ser. No. 70,092, Sept. 8, 1970, Pat. No. 3,747,063.

[52] U.S. Cl. .................................... 340/82; 340/340

[51] Int. Cl.[2] ........................................ B60Q 1/46

[58] Field of Search ............................... 340/82, 340

[56] References Cited

UNITED STATES PATENTS

| | | | |
|---|---|---|---|
| 3,479,641 | 11/1969 | Summers | 340/82 |
| 3,493,956 | 2/1970 | Andrews et al. | 340/340 |
| 3,622,980 | 11/1971 | Elledge, Jr. | 340/82 |
| 3,747,063 | 7/1973 | Hudson | 340/109 R |

*Primary Examiner*—Marshall M. Curtis
*Attorney, Agent, or Firm*—Richards, Harris and Medlock

[57] ABSTRACT

Sets of lamps arranged in adjacent opposed arrowhead configurations with each lamp energized by means of individual switching transistors having base drive voltages coupled through a multi-position switch to timing signals. The timing signals are generated by sequentially actuated flip-flops energized in response to impulses from a master clock and gating circuitry. Opposite directions are indicated by selectively energizing three sets of lamps forming three adjacent arrowheads, sequentially, in one direction, three similar sets in another direction, or by steadily illuminating one set of lamps forming an arrowhead while sequentially energizing lamps forming a shaft.

4 Claims, 6 Drawing Figures

DIRECTION WARNING INDICATOR ENERGIZING CIRCUIT

RELATED APPLICATIONS

This is a division of application Ser. No. 70,092, filed Sept. 8, 1970, now U.S. Pat. No. 3,747,063.

BACKGROUND OF THE INVENTION

1. Field of the Invention

The invention relates to a sequential direction indicator, and more particularly, to a direction indicator wherein lamp sets forming adjacent arrowheads or opposed arrowheads joined by a set of lamps forming a shaft are sequentially actuated in synchronism and wherein the illumination value of the lamps may be adjusted to any desired level.

2. History of the Prior Art

Different circumstances such as highway construction and repair make it desirable to be able to convey a warning for drivers of motor vehicles to change direction or lane. Warning should be instantly recognizable and attract the attention of the observer at first glance. Direction indicators such as reflectorized signs, which are illuminated by headlights of an approaching auto, and even signs which are formed of steadily light sources are insufficient to attract the attention of a motorist travelling at high speed. It is not uncommon for a turnpike motorist to undergo driving hypnosis and be in a semiconscious state at the time a direction warning is given. This requires a driver to be startled into consciousness by the warning sign.

To overcome the problems involved, arrays of flashing lamps and sequentially energized signs heretofore have been developed. In some such systems, a lamp set forming an arrowhead is continuously illuminated and a set of lamps forming an arrow shaft is sequentially energized to indicate the desired direction. An example of this type of system is that disclosed and claimed in U.S. Pat. No. 3,479,641 to Gerald C. Summers. While such systems are adequate for certain applications, in other situations it is desired to provide features which are not incorporated therein. For example, it is sometimes desirable to control the sequential energization of a lamp set with a master clock so that the rate of sequencing can be varied to conform with various state governmental requirements. Prior art systems, which use a series of relaxation oscillators to control sequencing, cannot be varied in rate without disturbing the symmetry of the sequencing. In certain situations, it is desirable to be able to dim the lamps of warning array to a very low level of illumination to avoid the risk of blinding motorists. Prior art sequence controls have not permitted dimming of sequenced lamps to much less than 2/3 of their total brightness because they were unable to dissipate the heat generated by dimming.

SUMMARY OF THE INVENTION

The invention relates to a sequential timing system for actuating a direction indicator for lamps arranged in sets to signal a direction and a timing module for producing a series of master timing signals. The timing module includes a master clock which energizes a series of sequencing gates which in turn control the periodic energization of a series of flip-flops. The outputs from the flip-flops energize gates which control driver transistors which in turn energize the light sets. A further feature of the invention includes pulse width modulation of the outputs from the gating circuitry so that the period of energization may be changed and the lamps dimmed from full brilliance to only very faint illumination.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
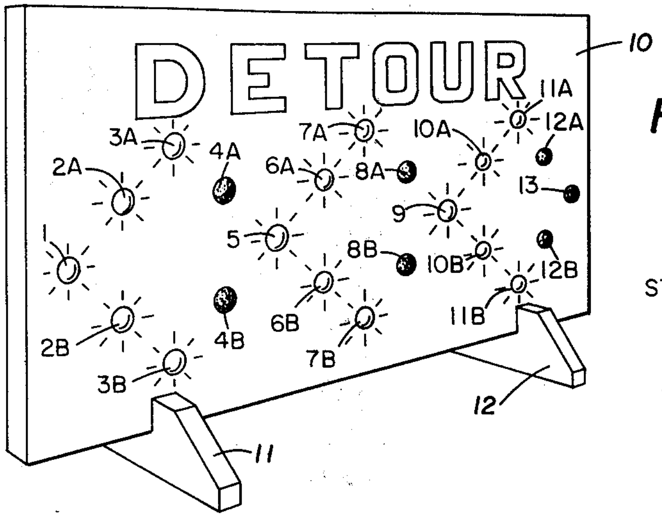
FIG. 1 is a perspective view of a light set illustrating the sequential energization of a plurality of arrowheads to indicate direction.

The sign illustrated in FIG. 1 is a semi-permanent type of billboard display which may be used in road construction and repair areas. The display is particularly useful in vehicle mounted signs used for warning motorists during highway and road maintenance. The sequential direction and indicator constructed in accordance with the invention is also useful with lamp arrays in fixed locations and can be used in such applications as routing aircraft traffic among runways and ramps of an airport. The signal lamp array shown in FIG. 1 is the subject of a U.S. Pat. application Ser. No. 750,236 filed Aug. 5, 1968, in the name of Fred Russell Elledge, Jr. and entitled Directional Warning System. It is to be understood that other lamp sets such as those having two opposed arrowheads connected by a common shaft, as shown in FIG. 1 of U.S. Pat. No. 3,479,641 to Gerald C. Summers, could be used with the timing and actuating system of the present invention. The lamp array illustrated herein in FIG. 1 is simply illustrative, as the circuitry of the invention can be arranged by one skilled in the art to produce a large variety of signals to control the sequential and alternating flashing of lamps.

Referring to FIG. 1, there is shown a billboard type sign 10 supported on stands 11 and 12 and containing a lamp array for indicating either a left or right direction. The lamp array includes 22 lamp sets labeled 1–13. The lamps are arranged with four central lamps 1, 5, 9 and 13 and a plurality of lamp pairs 2A&2B–1-2A&12B. Each of the lamp pairs A&B are connected together so that both lamps are always energized or deenergized simultaneously. Left indicating arrowheads are illustrated in FIG. 1 by illumination of the lamp sets 1–3, 5–7, and 9–11. Arrowheads indicating the right will be formed by the illumination of the lamp sets 3–5, 7–9, and 11–13.

Figure 2:
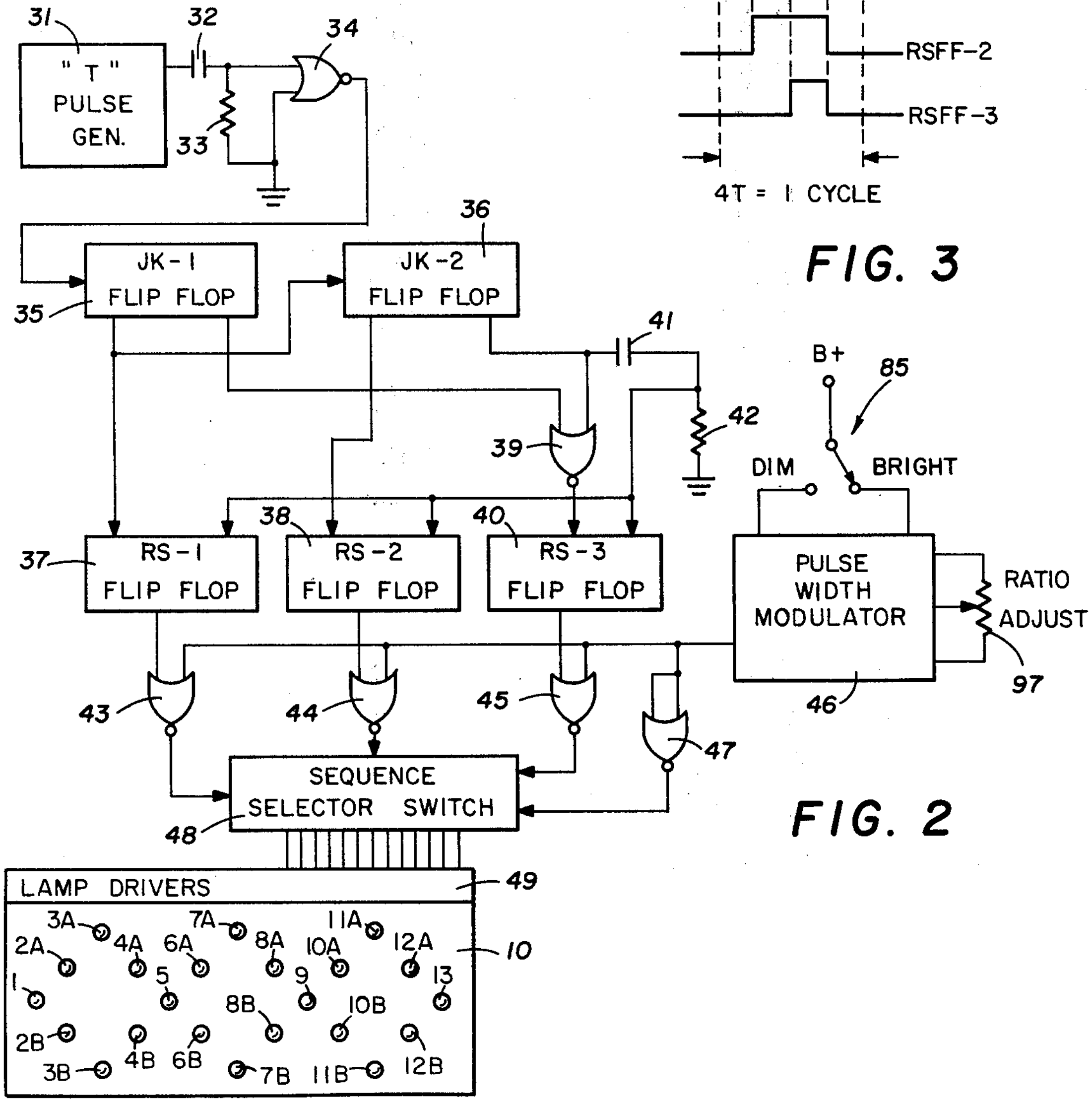
FIG. 2 is a block diagram of logic circuitry employed in the invention to generate width modulated control pulses and actuate the lamps of FIG. 1.

Referring to FIG. 2, there is shown a block diagram of the logic circuitry employed in the invention to generate the control signals for sequentially illuminating the lamps. A pulse generator 31 continuously generates a series of equally spaced timing pulses which are coupled through a capacitor 32 and a resistor 33 forming an RC network to the input of a NAND gate 34 which inverts and shapes the spike output of the generator. The pulse train is held at a constant frequency and acts as the master timing pulses for the system. The time T between pulses is nominally set at 375 milliseconds but can be varied, as further described below, for different requirements. The negative-going train of pulses is coupled to a first JK flip-flop 35, the Q output of which is coupled to both the input of a second JK flip-flop 36 and to the set input of a first RS flip-flop 37. The JK flip-flops referred to are of the type which have one input and two outputs. When one of the outputs is high, i.e., a "1", the other is low, i.e., a "0". The two outputs reverse their states each time a negative-going pulse is received at the single input. The RS flip-flops referred to are of the "set-reset" type which have a single output and a pair of inputs. When a signal, i.e. a "1", is placed on the "set" input of the RS flip-flop, the output goes high, i.e., becomes a "1" and remains in that state until a signal is placed on the "reset" input. If there is no longer a signal on the set input when the reset pulse occurs, the output returns to "0". The pair of JK flip-flops act as a counter which registers the number of pulses received from the generator 31 and produces a reset signal when a preselected number is reached.

The Q output of the second JK flip-flop 36 is connected to the set input of a second RS flip-flop 38 while the $\overline{Q}$ output of the second JK flip-flop 36 is connected to one input of a NAND gate 39 whose output is connected to the set input of a third RS flip-flop 40. The other input of the NAND gate 39 is connected to the $\overline{Q}$ output of the first JK flip-flop 35. The $\overline{Q}$ output of the second JK flip-flop 36 is also connected across a resistor 42 to the reset input of each one of the RS flip-flops 37, 38 and 40. The output of each of the RS flip-flops 37, 38 and 40 is connected, respectively, to one input each of three AND gates 43, 44 and 45. The other input of each of the gates 43, 44 and 45 is connected to the output of a pulse width modulator 46. The output of the pulse width modulator 47 is also connected to an isolation gate 47. The output of each one of the gates 43, 44, 45 and 47 is connected through a sequence selector switch 48, the operation of which will be further explained below. The sequence selector switch 48 applies operation pulses to a plurality of lamp driver circuits 49 which actuates the lamp array on the billboard 10.

Figure 3:
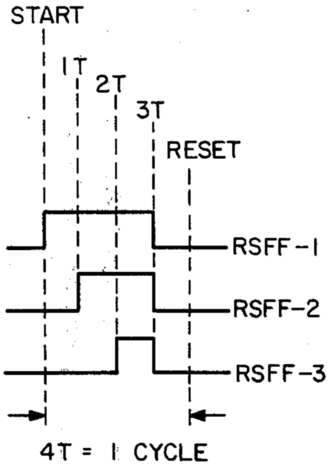
FIG. 3 is a pulse diagram illustrating the manner in which the sequential energization pulses are generated by the circuitry of FIG. 2.

In operation, it is first assumed that all the flip-flops have been reset to zero, that is the Q output of each of the JK flip-flops 35 and 36 are "0" while the $\overline{Q}$ outputs are "1", and the outputs of each of the RS flip-flops is zero. As the pulse generator 31 provides a series of negative-going pulses at the output of the NOR gate 34, the first T pulse causes the first JK flip-flop 35 to make a transition and the Q output becomes a "1" and the $\overline{Q}$ output a "0". This "1" output on the Q lead of the JK flip-flop 35 energizes the first RS flip-flop 37 to produce an output through the gate 43 to the sequence selector switch 48. This output energizes through the sequence selector switch 48 and lamp drivers 49 as further explained below, the first one of the arrowhead lamp arrays of the sequence of arrowheads. Referring briefly now to FIG. 3, we see that in the pulse diagram for the first RS flip-flop, an output pulse begins at time zero, the occurrence of the first T pulse, and extends through three T pulse periods as will be further explained. Referring again to FIG. 3, the second negative-going T pulse on the input of the first JK flip-flop 35 causes the outputs to again change state and the Q output returns from "1" to "0" while the $\overline{Q}$ output produces a "1". This transition of the Q output of the first JK flip-flop from a "1" to "0" produces a negative-going pulse at the input of the second JK flip-flop 36 which causes it to change state and produce a "1" at its Q output and a "0" at its $\overline{Q}$ output. This "1" energizes the second RS flip-flop 38 and causes it to produce an output through its gate 44 to the selector switch 48. Since each of the RS flip-flops will remain energized until pulsed by a reset pulse. The first RS flip-flop 37 remains energized and continues to produce its output pulse. In FIG. 3, it is shown that the output pulse of the second RS flip-flop begins at the end of a first T time period while the output from the first RS flip-flop continues. The output of the second RS flip-flop controls the energization of the second arrowhead in the array to be sequenced while the first arrowhead remains illuminated.

Referring back to FIG. 2, the "0" output of the $\overline{Q}$ lead of the second JK flip-flop provides one input to the NAND gate 39. Upon the occurrence of the third T pulse at the input of the first JK flip-flop 35, the flip-flop again changes states and a "1" appears at the Q output and a "0" appears at the $\overline{Q}$ output of that flip-flop. Since the first RS flip-flop 37 still remains in a set condition, the change in signal on the $\overline{Q}$ lead of flip-flop 35 has no effect and the RS flip-flop continues to produce its output. Similarly, since the JK flip-flops only make a state transition in response to a negative-going pulse, the occurrence of a "1" on the Q lead of the first JK flip-flop 35 does not effect the state of the second JK flip-flop 36. However, the occurrence of a zero at the $\overline{Q}$ output of the first JK flip-flop 35 provides a second zero to the second input of the NAND gate 39 to energize that gate and produce an output to the set input of the third RS flip-flop 40 which then produces an output through the NAND gate 45 to the sequence selector switch 48. Referring now to FIG. 3, we can see that the third RS flip-flop 40 is energized at the end of a time period equal to three entire T cycles. The output of the third RS flip-flop 40 controls the energization of the third arrowhead in the sequence.

At this point in the timing cycle, all three of the RS flip-flops 37, 38 and 40 are in an energized state and all three of the selected arrow points on the lamp array 10 will be fully energized. Upon the occurrence of the fourth T pulse in the sequence at the input of the first JK flip-flop 35, the Q output then returns from a "1" to a "0" condition which places a negative going pulse at the input of the second JK flip-flop 36 and causes it to change states. A positive-going pulse occurs at the $\overline{Q}$ output as it changes from a "0" to a "1". The pulse passes through the capacitor 41 and the resistor 42 to produce a reset pulse at the reset lead at each of the RS flip-flops 37, 38 and 40. Since there is no signal on the set inputs, the reset pulse deenergizes each one of the RS flip-flops and the output returns to zero. Since there is no output on any one of the Q outputs of the JK flip-flops, the RS flip-flops will not be reenergized until the beginning of the next cycle at the occurrence of the next T pulse.

The outputs of each of the RS flip-flops are connected to the sequence selector switch 48 through gates 43, 44 and 45, one input of each of which leads to the output of the pulse width modulator 46. The function of the modulator is to produce a width modulated pulse which is supplied to one of the inputs for each one of the AND gates. That is, even though the RS flip-flops continuously energize one of the inputs to the gate, the other input is only energized upon the occurrence of a signal from the pulse width modulator 46. By modulating the pulse width, a variable output is produced from each one of the gates, 43, 44 and 45, and therefore, a variable intensity driving signal is supplied to each one of the lamps. A bypass gate 47 is provided between the pulse width modulator 46 and the lamp driving circuits 49 to energize selected ones of the lamps of the array 10 in a continuous and non-sequencing fashion but which are also under control of the pulse width modulator to control the intensity of the lamp beams. The pulse width modulator 46 is activated by a bias switch 85. When the switch is placed in the bright position, the power supply voltage is connected to bypass the modulator and the lamps are energized at maximum brightness. When the bias switch 85 is placed in the dim position, the pulse width modulator 46 is energized to supply an output to illuminate the lamps of the array. The pulse width modulator 46 includes a potentiometer 97 which controls the modulation factor and varies the width of the pulses produced. Variation in the pulse width delivered to the inputs of the AND gates 43, 44 and 45 controls the modulation of the signal to the lamp drivers and hence the brilliance with which the lamps are illuminated. The lamps average the on-off ratio and the resulting light level is proportional to the on time.

From the logic diagram of FIG. 2 it can be seen how the timing and sequencing of the system is actuated under control of the master pulse generator 31. By changing the width of the time period T, the rate at which the arrowhead lamp arrays are sequenced can be varied. Since the sequencing is controlled by a master signal, a variation in rate does not upset the symmetry of the sequencing. Further, the use of pulse width modulation of the signal to the lamp drivers permits full control over the illumination intensity of the lamps in the array being sequenced.

Figure 4:
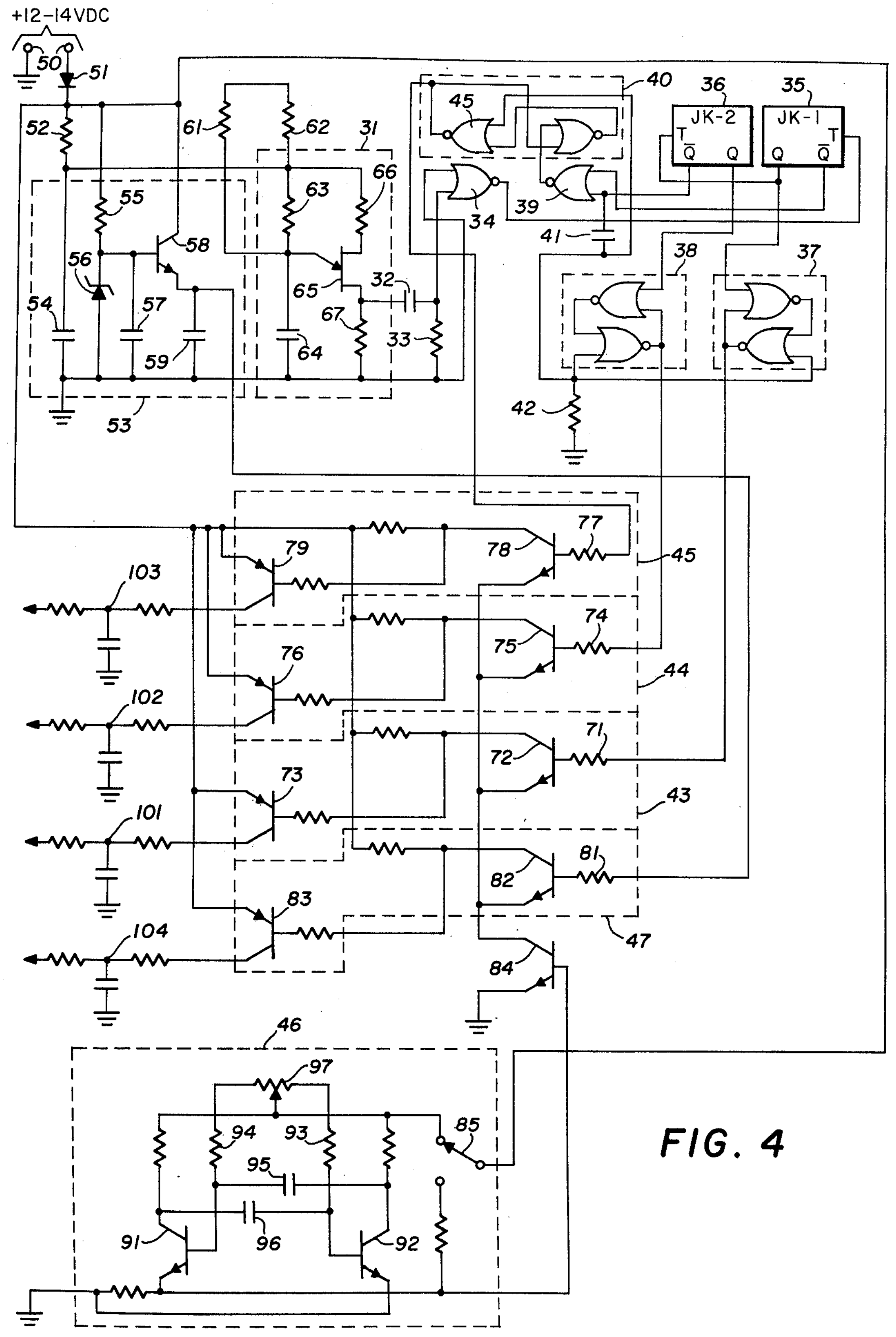
FIG. 4 is a schematic diagram of the circuitry employed to generate control pulses and actuate the lamps of FIG. 1.

The detailed circuitry used to implement the logic of FIG. 2 is shown in the schematic diagram of FIG. 4. A 12 to 14 volt DC source, such as from an automobile battery, is connected to the input terminals 50. Power is supplied through a diode 51 and a current limiting resistor 52 to a regulated DC power supply 53. The supply 53 includes an input capacitor 54 and a voltage adjusting resistor 55. A parallel connected zener diode 56 and capacitor 57 sets the voltage at the base of the regulator transistor 58. The output of the transistor 58 is connected across a capacitor 59 to supply voltage to the other components in the circuitry.

T pulse generator 31 is a unijunction relaxation oscillator having a first timing resistor 63 connected in parallel with a pair of series connected resistors 61 and 62 and connected to a timing capacitor 64. The capacitor 64 is connected to the emitter lead of a unijunction transistor 65. The base 2 and base 1 leads are connected, respectively, to a resistor 66 and a resistor 67. The capacitor 64 is charged through the resistive combination of 61, 62 and 63. In operation, as the voltage from the capacitor 64 rises to a value sufficient to energize the unijunction 65, conduction begins between the two drain leads and discharges the capacitor 64 through the resistor 67. The value of the resistor 62 may be changed by replacement to adjust the length of time required to charge the RC circuit and change the frequency of the oscillator 31. Since some governmental bodies require particular sequence rates for warning signals, the operator may replace the resistor 62 to adjust the rate of the master clock to conform. Nominally, resistor 62 has been selected so that the time period for a typical T pulse is 375 milliseconds.

The output of the pulse generator 31 is coupled to the capacitor 32 and the resistor 33 to the input of the NOR gate 34 which inverts and shapes the wave form of the pulses. The output of gate 34 is coupled to the T input of the first JK flip-flop 35, the Q output of which is connected to the set lead of the first RS flip-flop 37. The $\overline{Q}$ lead of the first JK flip-flop 35 is connected to one input of the NOR gate 39. The T input of the second JK flip-flop 36 is connected to the Q lead of the first JK flip-flop 35. The Q output of the second JK flip-flop 36 is connected to the set lead of the second RS flip-flop 38 while the $\overline{Q}$ lead is connected to the other input of the NOR gate 39. The output of gate 39 is connected to the set lead of the third RS flip-flop 40.

The $\overline{Q}$ output of the second JK flip-flop 36, which is connected to the second input of the NOR gate 39, is also connected to the capacitor 41 and the resistor 42. The signal across the resistor 42 is connected to the reset leads of each one of the RS flip-flops 37, 38 and 40. The outputs of the RS flip-flops 37, 38 and 40 are connected, respectively, to the gates 43, 44 and 45, which are a series of transistor pairs. The gate 43 is a base resistor 71 connected to transistor 72 the output of which is connected to the base of a second transistor 73. The gate 44 is resistor 74 connected to transistor 75 which is coupled to a second transistor 76. The gate 45 is resistor 77 connected to transistor 78 which is in turn connected to the base of a second transistor 79. The gate 47 comprises a base resistor 81 connected to a pair of series connected transistors 82 and 83. The base resistor 81 is connected directly to the power supply 53. The gate 47 is continuously energized for a "steady on", unmodulated condition of the lamp array. The emitter lead of each one of the transistors 72, 75, 78 and 82 is connected through the emitter-collector path of a modulation transistor 84. The base of the transistor 84 is connected through the bias switch 85. One pole of the switch is connected directly to the power supply 53 to remain continuously energized and the other pole is connected to energize the pulse width modulator 46.

The pulse width modulator 46 comprises an astable multivibrator having a variable duty cycle. The multivibrator includes a pair of transistors 91 and 92 cross-coupled through RC networks comprising resistors 93 and 94 and capacitors 95 and 96. The two resistors 93 and 94 are connected through the potentiometer 97 so that the charging time of the cross coupling can be varied. By varying the resistor 97, the period and width of the output pulses of the multivibrator can be varied. The output of the emitter of the transistor 91 is connected to the base of the modulation transistor 84. As the multivibrator produces pulses, it alternately energizes and deenergizes the emitter-collector path of the modulation transistor 84 so that it alternately provides a ground connection to the emitter leads of each of the transistors 72, 75, 78 and 82. Control of the modulation transistor 84 pulse width modulates the outputs of the transistors 72, 75, 78 and 82 so that depending upon the time during which the modulation transistor 84 is energized, input of the other transistors is gated. The outputs of the transistors 73, 76, 79 and 83 are connected to control the lamp driver transistors through RC filter networks 101, 102, 103 and 104 respectively. Since the pulses produced at output of each one of these transistors contains relatively sharp spikes, it was found that a substantial amount of noise was generated. By rolling off the edges of these spikes with RC networks, clean square waves are produced and less RF interference is generated. The outputs of each one of the transistors 73, 76 and 79 constitute the outputs which sequentially energize the three sets of light arrays.

Figure 5:
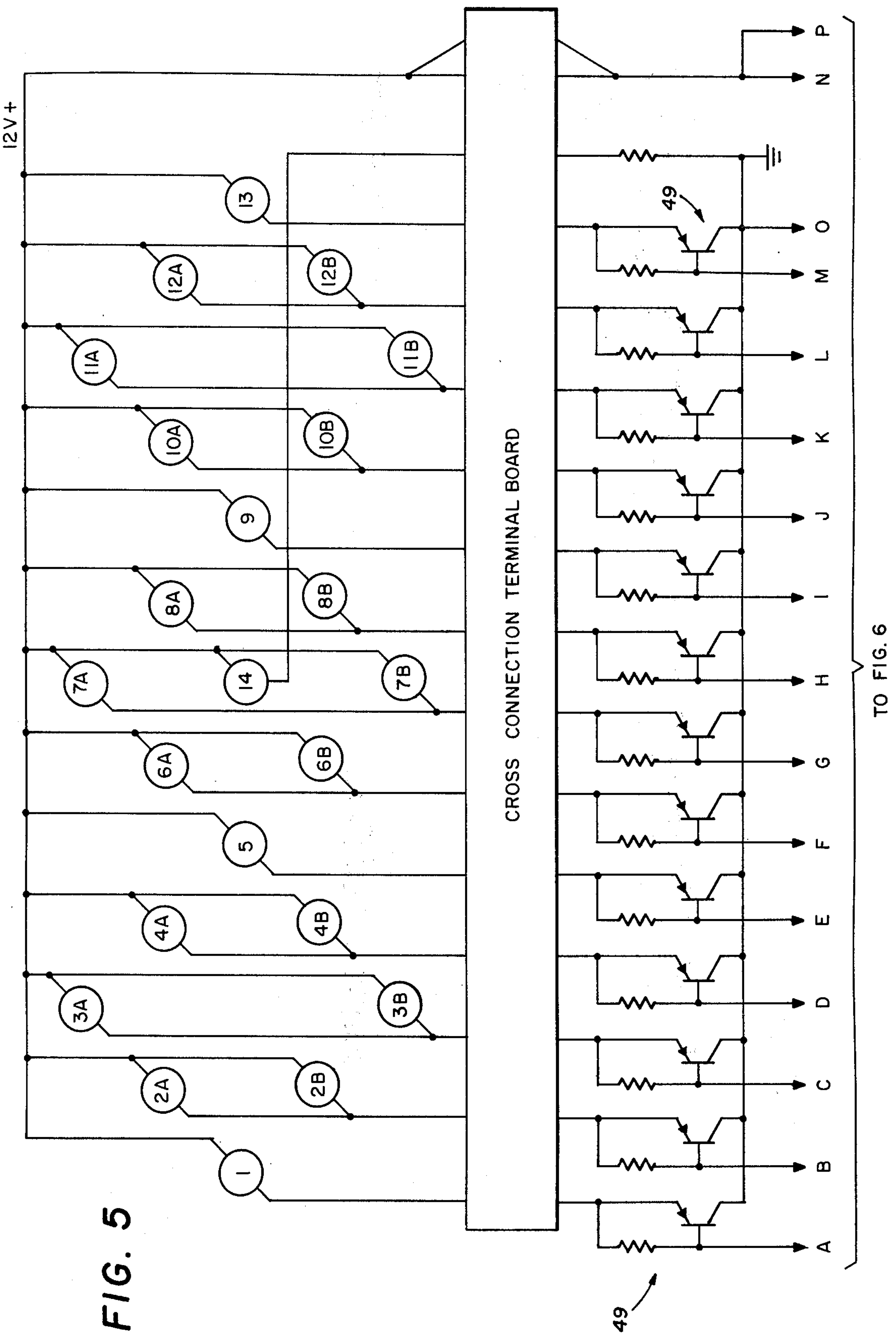
FIG. 5 is a schematic diagram of the lamp array and the driver transistors used to energize the lamps of FIG. 1.
Figure 6:
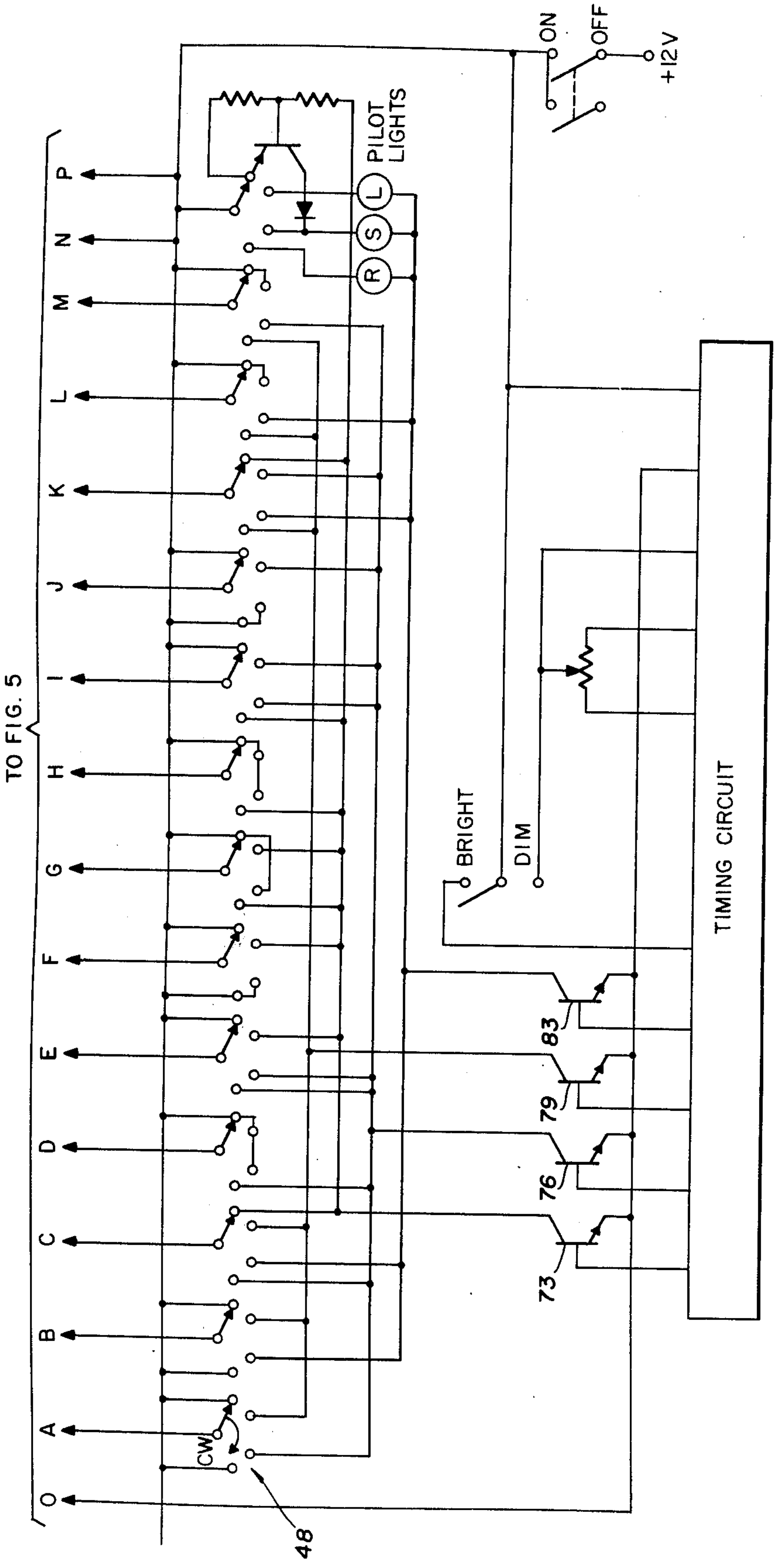
FIG. 6 is a schematic diagram of the multi-position mechanical switch which selects the mode of operation of lamp display.

As shown in FIG. 5, a multiposition rotary switch 48 is connected to the outputs of each one of the transistor circuits 73, 76, 79 and 83 and arranged so that when the switch 48 is in one position, the sequence of lamps to indicate a right sequencing arrow are energized and when a different position, a sequence for a left indicating arrow is indicated. Other positions for the switch are provided which include a travel mode in which lamps 3A & 3B, 11A & 11B blink simultaneously on and off and a simultaneous mode wherein the lamps forming the two ends arrowheads, lamps numbers 2A, 2B, 3A, 3B, 11A, 11B, 12A and 12B, burn steadily and lamps number 1, 5, 9 and 13 forming the shaft are blinked off and on. Referring to FIG. 6, the output of the multiposition rotary switch is connected through to a plurality of lamp driver transistors 49 which are associated with various ones of the lamp sets. When the driver transistors are energized by pulses from the outputs of the transistors 73, 76, 79 or 83, they are energized to cause current to flow through and energize the select ones of the lamp sets.

Having described the invention in connection with certain specific embodiments thereof, it is to be understood that further modifications may now suggest themselves to those skilled in the art and it is intended to cover such modifications as fall within the scope of the appended claims.

What is claimed is:

1. An energizing circuit for a direction warning indicator including a plurality of lamp sets arranged in a predesigned configuration and energized in a selected pattern, the improvement comprising:

pulse generator means for producing a preselected number of sequentially occurring output pulses with the leading edge of subsequent pulses displaced in time.

a pulse width modulator generating output pulses of adjustable width, adjustment means connected to said pulse width modulator for varying the output pulse width, and a plurality of gating means each having an output terminal connected to at least one of the lamp sets and individually enabled by one pulse from said generator means at one input thereto and collectively responsive at a second input to the adjustable width pulses.

2. An energizing circuit for a direction warning indicator as set forth in claim 1, the improvement further comprising said pulse width modulator including an astable multi-vibrator having a variable duty cycle.

3. An energizing circuit for a direction warning indicator as set forth in claim 2, the improvement further comprising said adjustment means including a variable resistor connected to said astable multi-vibrator to vary the duty cycle thereof.

4. An energizing circuit for a direction warning indicator as set forth in claim 1, the improvement further comprising said gating means including a logic gate producing an output pulse when both inputs thereto are receiving an input at the same logic level.

* * * * *